United States Patent
Cain et al.

(10) Patent No.: US 6,673,383 B2
(45) Date of Patent: Jan. 6, 2004

(54) METHOD FOR IMPROVING THE PERFORMANCE OF A FOOD PRODUCT

(75) Inventors: Frederick William Cain, Wormerveer (NL); Gerald Patrick McNeill, Channahon, IL (US); Tom Tongue, Channahon, IL (US)

(73) Assignee: Unilever Patent Holdings BV, Vlaardingen (NL)

( * ) Notice: Subject to any disclaimer, the term of this patent is extended or adjusted under 35 U.S.C. 154(b) by 28 days.

(21) Appl. No.: 09/816,863

(22) Filed: Mar. 26, 2001

(65) Prior Publication Data

US 2002/0172746 A1 Nov. 21, 2002

(51) Int. Cl.$^7$ .................................................. A21D 2/00
(52) U.S. Cl. ...................... 426/551; 426/96; 426/549; 426/561; 426/580; 426/581; 426/603; 426/653
(58) Field of Search ............................ 426/551, 561, 426/562, 563, 549, 580, 581, 94, 660, 603, 96, 653

(56) References Cited

U.S. PATENT DOCUMENTS

| | | | | | |
|---|---|---|---|---|---|
| 342,624 | A | * | 5/1886 | Michaelis | 426/561 |
| 1,230,452 | A | * | 6/1917 | Wiley | 426/561 |
| 2,851,359 | A | * | 9/1958 | Diller | 426/561 |
| 2,978,331 | A | * | 4/1961 | Ferrari | 426/653 |
| 2,992,111 | A | * | 7/1961 | Ferrari | 426/653 |
| 3,623,889 | A | * | 11/1971 | Falconer | 426/561 |
| 4,004,036 | A | * | 1/1977 | Schmitt | 426/561 |
| 4,716,046 | A | * | 12/1987 | Lavie | 426/96 |
| 6,436,453 | B1 | * | 8/2002 | van Lengerich et al. | 426/74 |

* cited by examiner

Primary Examiner—Lien Tran
(74) Attorney, Agent, or Firm—Morgan Lewis & Bockius LLP

(57) ABSTRACT

A method for improving the chalky-off taste and/or the homogeneity of a solid, active component in a food product by incorporating in the food product an effective amount, preferably 1 to 70 wt % on food product, of a structured particulate system comprising one or more active components in a matrix in a weight ratio of 1:99 to 99:1 and wherein the mean weight diameter of the particles of the structured particulate system ranges from 25 to 500 microns.

9 Claims, No Drawings

METHOD FOR IMPROVING THE PERFORMANCE OF A FOOD PRODUCT

BACKGROUND OF INVENTION

Quite a few documents exist wherein the performance of a food product is disclosed as a function of externally added agents with a functionality for the food products such as the addition of thickeners to increase the viscosity of the food product, the addition of crystallisation inhibitors to retard the post crystallisation of specific components, in general the fat components of a food product, the addition of bloom inhibitors to retard the blooming of chocolates, the addition of flavours to increase the flavour of a food product etc. It was found that in many instances the addition of these components led to problems often related to the oral mouth-feel but also to the bio-availability of the active component added while also the homogeneity of the final food product was affected in a negative sense due to a poor dispersability of the active component in the food product.

Moreover it would be beneficial if special effects could be obtained (such as the creation of fizziness) if two components could be added simultaneously to a food product which when in contact with each other in a homogeneous surrounding would react with each other e.g. under evolution of gas. So far this was not well attainable.

BRIEF SUMMARY OF INVENTION

We studied whether we could solve the problems of the prior art set out above. This study resulted in our invention which concerns in the first instance a method for improving the oral properties and/or bioavailability and/or the homogeneity of a solid, active component in a food product by incorporating in the food product an effective amount, preferably 1 to 70 wt % on food product of a structured particulate system comprising one or more active component(s) in a matrix in a weight ratio of 1:99 to 99:1 and wherein the mean weight diameter of the particles of the structured particulate system ranges from 25 to 500 microns.

The active components are fully incorporated in the matrix and retain their original particle size. It was therefore remarkable that although the particle size of the structured particulate system is bigger than the particle size of its individual components that still the oral properties of the food composition are improved by the incorporation of the structured particulates. We found that the active components are incorporated as individual particles that are not in contact with each other in a network that is formed by the matrix. This is also the reason why in the particulate system different particles can be present that would react with each other when added to the food product as individual particles. The best results were noticed when the structured particulate system displayed a loose bulk density of 0.1 to 1.1, preferably 0.3 to 0.6 Kg/l. Loose bulk density being measured by measuring the volume of a known mass powder sample, that has passed through a screen into a gradulated cylinder. The procedure is described in USP<616<Bulk Density and Tapped Density.

DETAILED DESCRIPTION OF THE INVENTION

It is preferred to use particulate systems wherein the mean weight diameter ranges from 50 to 400, more preferably from 60 to 300 microns.

The weight ratio between active components and matrix can range within a broad range but is preferably 80:20 to 20:80, most preferably from 60:40 to 40:60.

The discrete particle size of the active components in the total particulate system suitably ranges from of 2 to 275, preferably 5 to 250, most preferably 7 to 200 microns.

The active components can be of very different nature. Very good results were obtained with active components that are nutritionally active. In particular active components that improve the oral properties of a food product, or the bio-availability of the active component or the dispersability of the active component in a food have been proven to be very useful. However the active component can also be a mix of two active components which will react with each other when in contact with each other. Examples of such components are one or more of the components selected from the group consisting of: alkali or alkali earth metals such as salts of Na, K, Ca and Mg, in particular $Na_2CO_3$, $NaHCO_3$, $K_2CO_3$, $KHCO_3$, $CaCO_3$; $Ca(HCO_3)_2$; $CaSO_4$; $Ca(NO_3)_2$; $CaSO_3$; $Ca(HSO_3)_2$; $MgCO_3$; $Mg(HCO_3)_2$; and organic acids such as citric acid, malic acid, tartaric acid, maleic acid, lactic acid, acetic acid or derivatives or salts thereof. It was found that by using these active components in one and the same food product by adding them in the form of a structured particulate system of these two or more components special effects could be achieved such a fizziness upon baking or eating of the food product due to the fact that either the baking operation or the eating brought the two components that could react with each other in contact with each other so that a reaction between the two components could take place e.g. under the evolution of a gas(e.g. $CO_2$).

The matrix can be any edible matrix, however we have a preference for a matrix selected from the group consisting of polysaccharides, modified polysaccharides, sugars, gums, thickeners, stabilisers, syrups, flours, starches, dextrose, maltodextrins and celluloses.

The particles of the matrix can have a particle size of 1 to 400 microns, but have preferably a size of 5 to 200 and in particular of 25 to 100 microns.

The food products that can be applied can be selected from a broad range of food products but are preferably selected from the group consisting of margarine, spreads, baked goods, extruded goods, confections, ice-creams and dairy products. From these products the baked goods are the most preferred. According to a last embodiment of the invention the invention also concerns with food products with improved oral properties and/or enhanced bioavailability of its active component and/or with a better homogeneity and/or a fizzy effect upon use, which food products comprise an effective amount of a structured particulate of one or more solid active components in a matrix in a weight ratio of 1:99 to 99:1 and having a mean weight diameter of 25 to 500 micron.

Effective amount being the amount giving the desired effect. This amount will be different for the different active components,for the different food products and for the different effects aimed for. However it was found that by applying our invention it was easy to provide a human in need of an active health component with 10 to 100% of its recommended daily dosage of this active component by feeding this human with a normal daily dosage of the food products.

EXPERIMENTAL PART

Examples I & II

Process for Making Structured Particulate

The following recipe was applied 2.5 kg 6×sugar (50% 6×sugar), 1.325 kg calcium carbonate (26.5% CalEssence 300),
1.115 kg dextrose (22.3% Clintose Dextrose),
0.03 kg maltodextrin (0.6% Maltrin M-100), and
0.03 kg microcrystalline cellulose (0.6% Avicel PH101)

The equipment used for this example was a pilot-scale 5 kg fluid-bed drier top spray. The 6×powder sugar, calcium carbonate, 1.085 kg of the dextrose, and microcrystalline cellulose were placed into a bowl.

The maltodextrin and the remaining 0.03 kg of the dextrose were mixed in warm water at 25° C. (1.0% solids in solution) as the spray solution.

An outlet temperature range of about 38° C.) was used and an air volume, sufficient (damper ½ open) to fluidize the product was set. The spray solution was sprayed onto the product in the bowl at a spray rate of 60 grams per minute with an atomization air pressure of 2.8 bar. Upon completion of the spray solution, the structured particulate was dried at an outlet air temperature of 40° C. for 5 minutes. The structured particulate was measured for loss on drying using a Metler LP-16 Metler Moisture Balance result was 2.45%. The structured particulate was sized on a US#20 mesh using a Sweco Sifter to remove any oversized material. A second batch was made following the same parameters as in the first example the only change was that an atomization air pressure of 3.1 bar was applied to evaluate particle size. Further analytical data for Examples I & II are shown in Table I. The methods used for analyzing the structured particulate can be found in USP XXIII/NF19.

TABLE I

Analytical Data

|  | Example I | Example II |
| --- | --- | --- |
| Activity % CaCO3 | 25.9% | 25.8% |
| PS on #20 | 0.0% | 0.0% |
| 40 | 8.1% | 1.5% |
| 60 | 18.8% | 6.1% |
| 80 | 18.5% | 12.0% |
| 100 | 12.3% | 10.7% |
| 200 | 27.3% | 39.7% |
| PAN | 15.0% | 30.0% |
| Loose Bulk | 0.45 g/cc | 0.45 g/cc |
| Loss on Drying | 2.2% | 2.2% |

The active component (raw material calcium carbonate) used had a particle size distribution of 99.9% through a US#325 mesh and loose bulk density of 0.5 g/cc. Supplier data indicated that this material had a diameter of 3 microns. The method for analyzing the material can be found in USP XXIII/NF19. The mean weight diameters were calculated as follows: weight fraction at screen multiplied by screen opening (microns), summed for all screen sizes.

Flavour Sensory Examples

Example 3

Glaze Frosting

A standard Glaze Frosting was made from 108.32 g of 6×sugar and mixing it with 21.47 g of water. Mixing was done by hand for 1 minute (60 strokes) creating a smooth texture.

The structured particulate raw ingredients where weighed according to the percentages of the structured particulate (6×sugar 50%, calcium carbonate 26.5%, dextrose 22.3%, maltrodextrin 0.6%, and microcrystalline cellulose 0.6%) and mixed with 21.47 g of water. Mixed by hand for 1 minute (60 strokes). Observation: The Glaze Frosting had large clumps therefore an additional 2 minutes of mixing was performed after which a smooth texture was obtained.

Sensory Taste Panel

The following sensory evaluation was carried out to determine the degree of chalky off taste present in the samples. Ten taste panelists evaluated all three samples in a blind sensory test.

Each sample was rated on a scale from 0–10; 0 equals no chalky off taste, 5 is moderate chalky off taste, and 10 high level of chalky off taste. The results of the panel were as follows: 100% of the panelists scored the standard Glaze Frosting as 0 (no chalky off taste); 80% scored the structured particulate Glaze Frosting based on formulations I and II as 3, commenting the flavor was slight to no chalky taste; for the Glaze Frosting based on the use of the raw ingredients of the structured particulates, 80% had a score of 8, commenting chalky to metallic off taste.

Example 4

No Bake Chocolate Ball Cookies

| Fomulations: | Structured Particulate | Raw Ingredients |
| --- | --- | --- |
| Chocolate Wafer Cookies (finely crushed) | 257.92 g | 257.92 g |
| Finely chopped pecans | 210.3 g | 210.3 g |
| Structured Particulate (CaCO3) | 216.64 g | — |
| 6X Sugar | — | 159.23 g |
| Calcium Carbonate | — | 57.41 g |
| Vanilla Extract | 14.31 g | 14.31 g |
| Water | 50.8 g | 50.8 g |
| Light Corn Syrup | 79.72 g | 79.72 g |

Procedure

Dry ingredients were mixed in a Hobart mixer Model N-50 for 2 minutes at a setting of 1. The liquid ingredients were added together and then slowly poured into the dry ingredients at a Hobart mixing setting of 1 for 3 minutes. Cookie dough was shaped into 2.3 cm balls (23 grams).

The total amount of calcium supplied per cookie was: 637.9 mg calcium per cookie Sensory Taste Panel The following sensory evaluation was carried out to determine the degree of chalky off taste present in the samples. Ten taste panelists evaluated formulation I and formulation II in a blind sensory test.

Each sample was rated on a scale from 0–10; 0 equals no chalky off taste, 5 is moderate chalky off taste, and 10 high level of chalky off taste. The results of the panel are as follows: 90% of the individuals scored the formulation I cookies as 2 (insignificant chalky off taste) and 70% scored the formulation II cookies as 7, commenting the flavor was moderate to chalky taste. The results indicate that the structured particulates improved the oral properties whereas the raw ingredients by themselves do not.

Example 5

Homogeneity

This example illustrates the effect of different forms of calcium on homogeneity in food products (460 milligrams of calcium per 43-gram bar) using the structured particulates and calcium carbonate raw ingredient.

Incorporation of Structured Particulate:

Tempered Chocolate. White chocolate (449.5 g) was weighed out and melted in a bowl. 50.5 g of Structured Particulate was added to the chocolate & stirred by hand for 20 seconds showing homogeneity. The Structured Particulate mixed very easily into the chocolate. The chocolate mixture was poured into molds, tapped and scraped evenly. The molds were then placed into the cooling chamber at 14.4° C. for proper cooling until the chocolate was set. The molds were then removed from the cooling chamber and the chocolates were removed from the molds.

Incorporation of Calcium Carbonate Raw Ingredient:

Tempered Chocolate. White chocolate (486.5 g) was weighed out and melted in a bowl. 13.5 g of calcium carbonate raw ingredient was added to the chocolate & stirred for 20 seconds. The calcium carbonate was very lumpy and difficult to mix therefore the mixing was continued for another 2 minutes. The chocolate mixture was poured into molds, tapped and scraped evenly. The molds were placed into the cooling chamber at 14.4° C. for proper cooling until the chocolate was set. The molds were then removed from the cooling chamber and the chocolates were removed from the molds.

Inspection: The structured particulates and the calcium carbonate raw ingredient white chocolate bars were broken into several pieces. Upon examination, the calcium carbonate raw ingredient white chocolate bars were found to have large white powdery inclusions, indicating poor homogeneity of calcium within the chocolate bar. On the other hand, the structured particulate white chocolate bars were found to be free from powdery inclusions and were completely homogenous.

What is claimed is:

1. In a method comprising the incorporation into a food product of a solid, active component which normally would result in an undesired chalky taste, reduction in homogeneity or both, the improvement which provides at least one of (i) a reduction in chalky taste and (ii) improved homogeneity, said improvement comprising incorporating said solid active component into said food product as an effective amount of a structured particulate system comprising one or more of said active components in particle form incorporated in a matrix forming a network which holds the active particles separate from each other as individual particles retaining their original size, the active component(s) and matrix being present in a weight ratio of 1:99 to 99:1 and wherein the mean weight diameter of the particles of the structured particulate system ranges from 25 to 500 microns, said matrix being edible and consisting essentially of a material selected from the group consisting of polysaccharides, modified polysaccharides, sugars, gums, thickeners, stabilisers, syrups, flours, starches, dextrose, maltodextrins and celluloses.

2. Method according to claim 1 wherein the structured particulate system displays a loose bulk density of 0.1 to 1.1 Kg/l.

3. Method according to claim 1 or 2 wherein the mean weight diameter of the structured particulate system ranges from 50 to 400 microns.

4. Method according to claim 1 wherein the weight ratio between active component and matrix ranges from 80:20 to 20:80.

5. Method according to claim 1 wherein the active component is solid and has a discrete particle size within the total structured particulate system of 2 to 275 microns.

6. Method according to claim 1 wherein the active solid component is a nutritionally active component.

7. Method according to claim 1 wherein the active component is selected from the group consisting of: $Na_2CO_3$, $NaHCO_3$, $K_2CO_3$, $KHCO_3$, $CaCO_3$; $Ca(HCO_3)_2$; $CaSO_4$; $Ca(NO_3)_2$; $CaSO_3$; $Ca(HSO_3)_2$; $MgCO_3$; $Mg(HCO_3)_2$; citric acid, malic acid, tartaric acid, maleic acid, lactic acid, acetic acid and derivatives and salts thereof.

8. Method according to claim 1 wherein the structured particulate system is added to a food product, selected from the group consisting of margarine, spreads, baked goods, extruded goods, confections and dairy products in an effective amount.

9. A food product having incorporated therein one or more solid active components which would normally result in at least one of undesired chalky taste and reduced homogeneity, said food product demonstrating at least one of (i) reduced undesired chalky taste and (ii) better homogeneity by including therein said one or more solid active components in the form of an effective amount of a structured particulate of one or more solid active components in a matrix forming a network which holds the active particles separate from each other as individual particles retaining their original size, the active component(s) and matrix being present in a weight ratio of 1:99 to 99:1 and having a particle size of 25 to 500 micron, said matrix being edible and consisting essentially of a material selected from the group consisting of polysaccharides, modified polysaccharides, sugars, gums, thickeners, stabilisers, syrups, flours, starches, dextrose, maltodextrins and celluloses.

* * * * *